(12) United States Patent
Nair et al.

(10) Patent No.: US 9,594,716 B1
(45) Date of Patent: Mar. 14, 2017

(54) PLUGGABLE MODULE FOR SIGNAL RELAY BETWEEN COMMUNICATION CARDS

(71) Applicant: Juniper Networks, Inc., Sunnyvale, CA (US)

(72) Inventors: Vijit V. Nair, San Jose, CA (US); Franklin D. Boyden, Pleasanton, CA (US); Nathan J. Berg, Mountain Vew, CA (US); Satish Dattatray Deo, Cupertino, CA (US); Akhil Kumar Agrawal, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 847 days.

(21) Appl. No.: 13/932,677

(22) Filed: Jul. 1, 2013

(51) Int. Cl.
*G06F 13/40* (2006.01)

(52) U.S. Cl.
CPC .................. *G06F 13/4068* (2013.01)

(58) Field of Classification Search
None
See application file for complete search history.

(56) References Cited

U.S. PATENT DOCUMENTS

| | | | | |
|---|---|---|---|---|
| 4,887,278 | A * | 12/1989 | Gupta | H04B 3/145 178/69 N |
| 8,054,619 | B1 | 11/2011 | Antosh | |
| 2012/0008727 | A1* | 1/2012 | Mohajeri | H03L 7/06 375/376 |
| 2013/0073749 | A1* | 3/2013 | Tremblay | H04L 43/087 710/16 |
| 2014/0049931 | A1* | 2/2014 | Wellbrock | H04B 10/801 361/788 |

* cited by examiner

*Primary Examiner* — Idriss N Alrobaye
*Assistant Examiner* — Dayton Lewis-Taylor
(74) *Attorney, Agent, or Firm* — Shumaker & Sieffert, P.A.

(57) ABSTRACT

Techniques are described for an electronic device in which a communication plane having a plurality of slots for receiving communication cards further includes an interface for receiving a pluggable module that operates to relay signals within the communication plane. The electronic device includes a plurality of removable communication cards and a communication plane having slots for receiving the plurality of removable communication cards. The electronic device also includes the pluggable module that is removably coupled to and external from the communication plane. The pluggable module receives a signal from a transmitting communication card from off of the communication plane, compensates for loss experienced by the signal or loss that will be experienced by the signal, and transmits the compensated signal back onto the communication plane and to a receiving communication card.

22 Claims, 7 Drawing Sheets

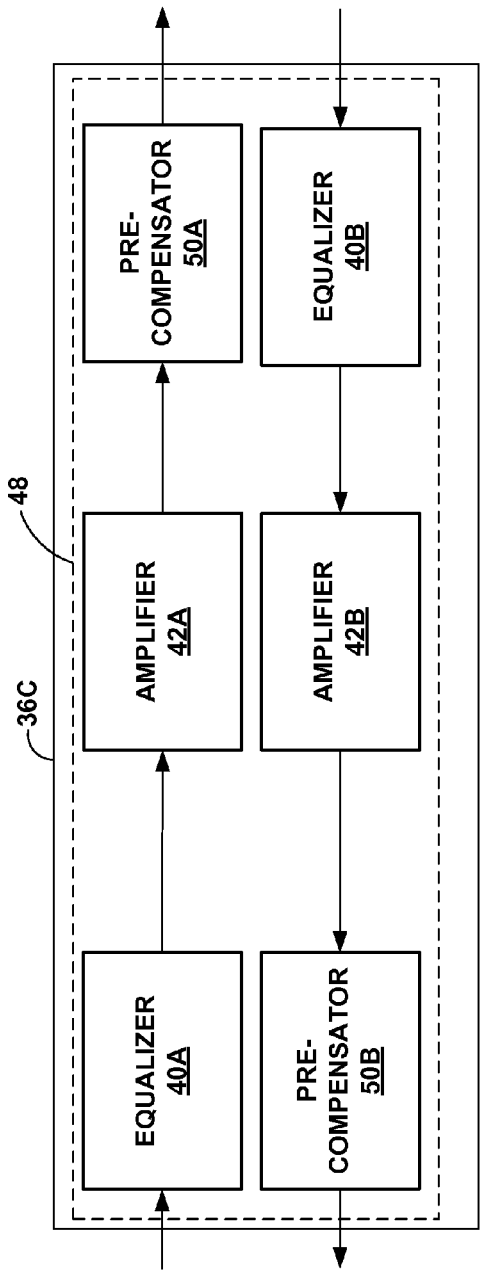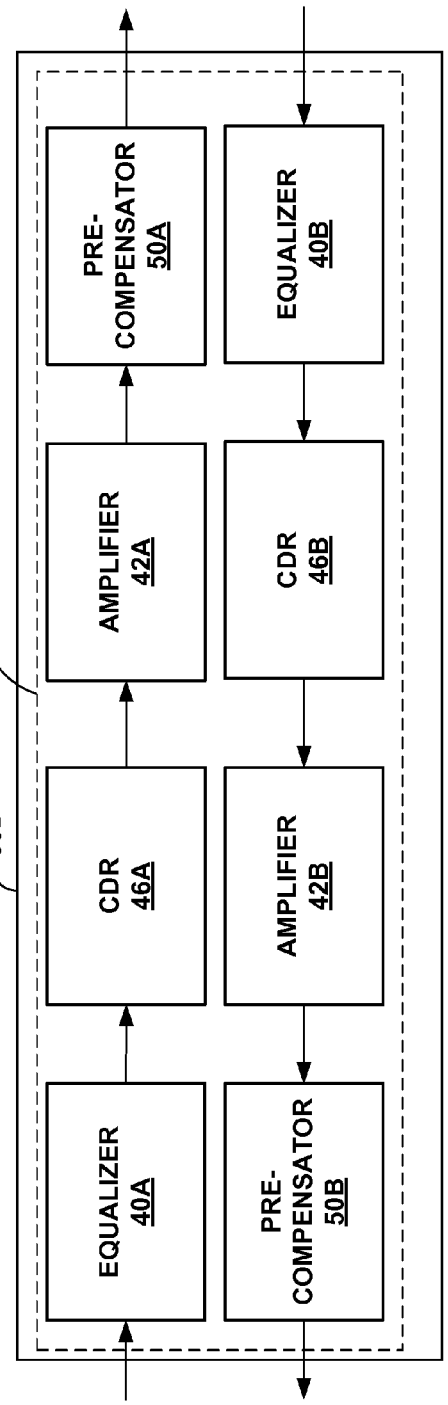

PLUGGABLE MODULE FOR SIGNAL RELAY BETWEEN COMMUNICATION CARDS

TECHNICAL FIELD

This disclosure relates to electronic devices and, more particularly, to communication planes, such as backplanes and mid-planes, that provide communication interconnects between components of electronic devices.

BACKGROUND

A communication plane, such as a backplane or a mid-plane, of an electronic device includes a plurality of slots that are interconnected with transmission lines (e.g., traces or paths) formed on or within the communication plane. Each slot receives a communication card, and the communication cards communicate with one another via the transmission lines.

For high data rate communication, there is a practical limit to the length of the transmission lines of the communication plane without affecting transmission quality. For instance, insertion loss of a transmitted signal is a function of the length of the transmission line. If the transmission line is too long, the insertion loss may corrupt the transmitted signal to a point that a receiving card is unable to properly reconstruct the transmitted signal. As a result, there is a practical limit on the size of the communication plane within the electronic device.

SUMMARY

In general, this disclosure describes an electronic device in which a communication plane having a plurality of slots for receiving communication cards further includes an interface for receiving a pluggable module that operates to relay communication signals within the communication plane. The pluggable module reconstructs a transmitted signal at a point within a transmission path of the communication plane and operates to relay the transmitted signal within the communication plane of the electronic device. For example, the pluggable module may be removably coupled to the communication plane of the electronic device.

A transmitting card, operably coupled to the communication plane within a first slot, transmits a signal along a transmission path that traverses a portion of the communication plane and then is fed off of the communication plane to the pluggable module. The pluggable module operates to reconstruct the signal, and transmit the reconstructed signal back onto the communication plane. The signal traverses a remaining portion of the communication plane, at which point a receiving card, operably coupled to the communication plane within a second slot, receives the reconstructed signal.

In this way, the techniques route a transmitted signal through the pluggable module as part of the communication plane interconnecting a plurality of communication cards. The pluggable modules may allow the transmitting card and the receiving card, on the communication plane, to be at a path distance greater than what would be allowed if the signal traversed only the communication plane.

Moreover, the pluggablity of the pluggable module allows for ease of scaling. For example, the communication cards may be configured to operate at a particular data rate, and the pluggable module may be configured to operate at that data rate. If the electronic device is to operate at a different data rate, a user may remove the current communication cards and replace them with communication cards that operate at the different data rate. In addition, the pluggability of the pluggable module allows the user to remove the current pluggable module, and replace the pluggable module with a pluggable module that operates at the different data rate. In this example, the user does not need to replace the communication plane, which can be difficult and costly, to configure the electronic device to operate at the different data rate. In this manner, the pluggability of the pluggable module allows for scaling the electronic device to different data rates without needing to replace the communication plane.

In one example, the disclosure describes an electronic device comprising a plurality of removable communication cards, a communication plane having a set of slots that provide electrical interfaces for receiving the plurality of removable communication cards. In this example, the communication plane includes a first transmission line, of a plurality of transmission lines, along which a first one of the communication cards transmits a signal and a second transmission line, of the plurality of transmission lines, along which a second one of the communication cards receives a compensated version of the signal. The electronic device also includes a pluggable module that is removably coupled to and external from the communication plane. In this example, the pluggable module comprises an input interface to receive the signal from the first transmission line and off of the communication plane, one or more circuits to compensate for at least one of loss experienced by the signal due to the transmission along the first transmission line and loss that will be experienced due to transmission along the second transmission line, and an output interface to transmit the compensated signal back onto the communication plane and to the second communication card along the second transmission line.

In one example, the disclosure describes a method comprising transmitting, with a first one of a plurality of communication cards, a signal along a first transmission line of a plurality of transmission lines of a communication plane of an electronic device. The method also includes receiving, with a pluggable module that is removably coupled to and external from the communication plane, the signal from the first transmission line and off of the communication plane, compensating, with the pluggable module, for at least one of loss experienced by the signal due to the transmission along the first transmission line and loss that will be experienced due to the transmission along a second transmission line of the communication plane, and transmitting, with the pluggable module, the compensated signal back onto the communication plane and to a second one of the plurality of communication cards along the second transmission line of the communication plane. The method further includes receiving, with the second one of the plurality of communication cards, the compensated signal.

In one example, the disclosure describes a pluggable module comprising an input interface configured to receive a signal from off of a communication plane. In this example, the signal is transmitted by a first communication card along a first transmission line of the communication plane. The pluggable module also includes one or more circuits configured to compensate for at least one of loss experienced by the signal due to the transmission along the first transmission line and loss that will be experienced due to transmission along a second transmission line, and an output interface configured to transmit the compensated signal back onto the communication plane and to a second communication card along the second transmission line of the communication plane. In this example, the pluggable module is removably coupled to and external from the communication plane.

The details of one or more examples of the disclosure are set forth in the accompanying drawings and the description below. Other features, objects, and advantages of the examples will be apparent from the description and drawings, and from the claims.

BRIEF DESCRIPTION OF DRAWINGS

FIGS. 3A-3D are block diagrams illustrating example processing flow within pluggable modules.

DETAILED DESCRIPTION

Figure 1A:
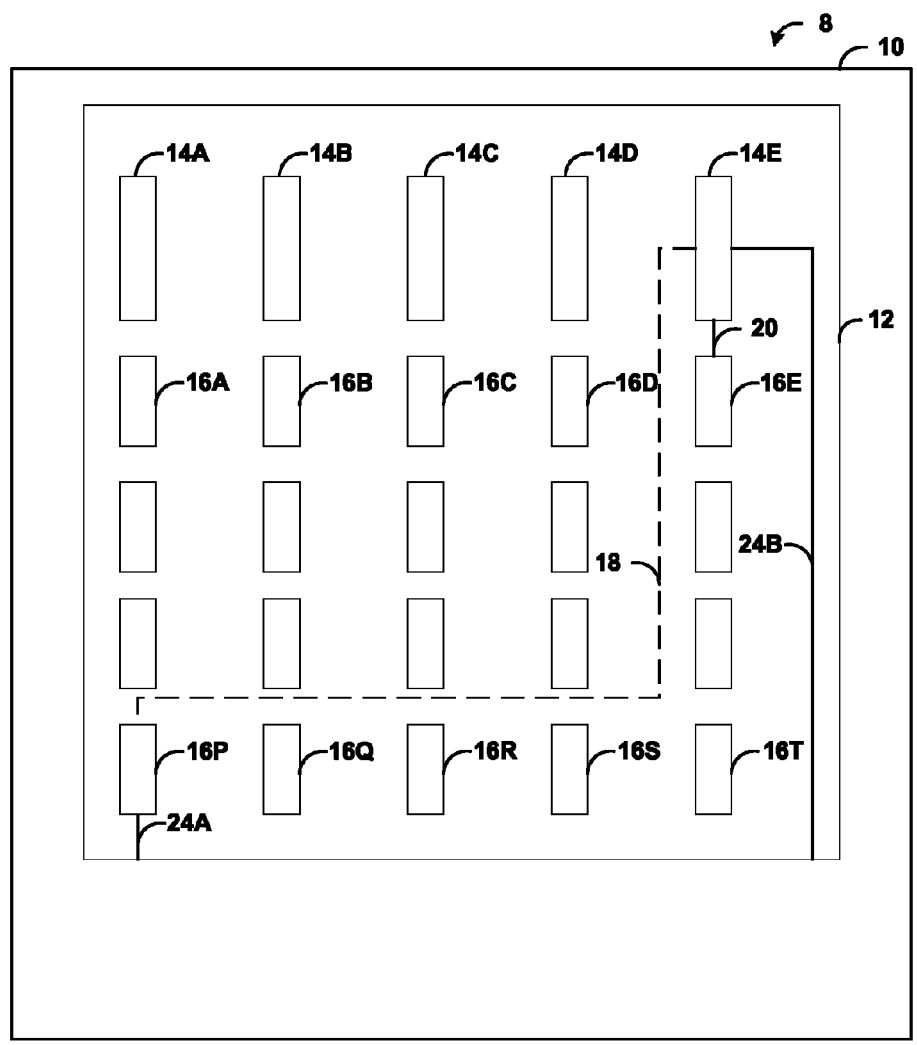
FIGS. 1A and 1B are block diagrams illustrating an example portion of an electronic device in which a chassis includes a communication plane.
Figure 1B:
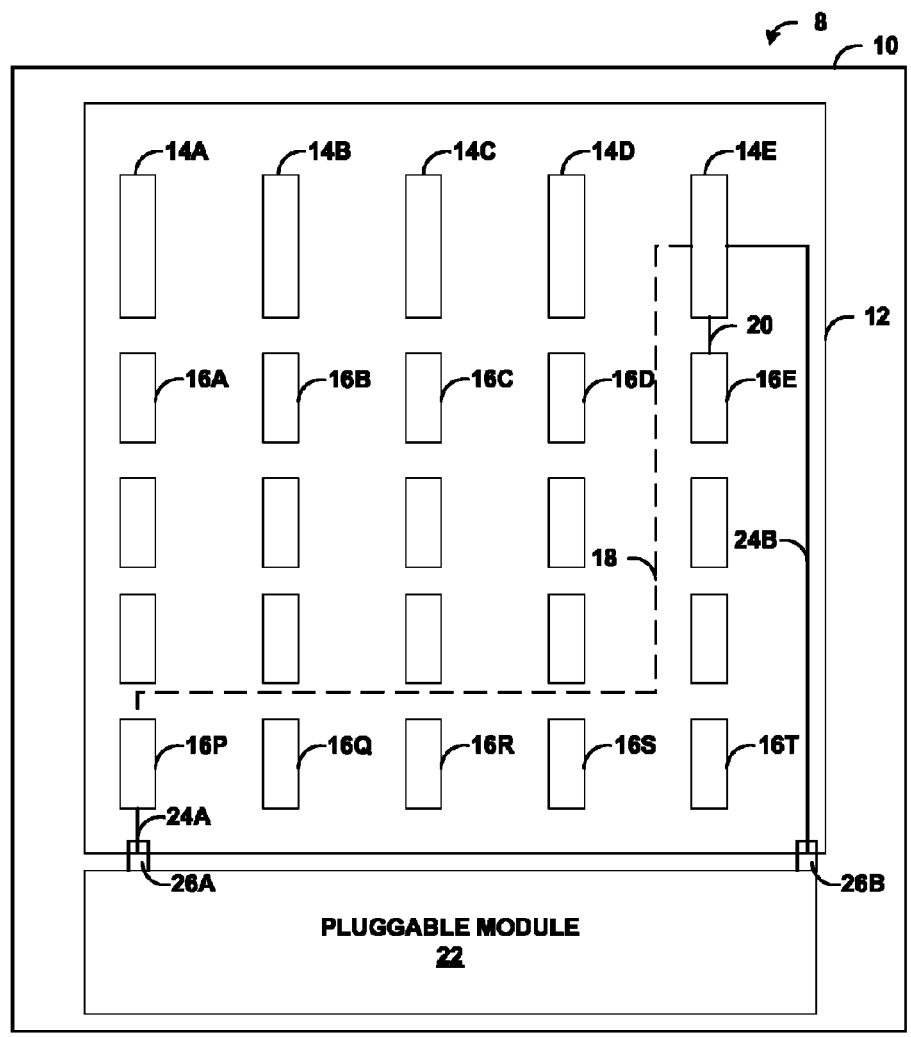

FIGS. 1A and 1B are block diagrams illustrating an example portion of an electronic device 8 in which a chassis 10 includes a communication plane 12. Chassis 10 may be a chassis for a communication device such as a router; however, the techniques are not limited to chassis 10 being a chassis for a router. As one example, the router routes data in a network such as the Internet or a local area network (LAN).

In some cases, chassis 10 may house a plurality of communication planes. In one example, a primary communication plane (referred to as a "backplane") is electrically coupled to a set of communication planes (referred to as "mid-planes") that are placed front-to-back within chassis 10 and together form the backbone of the device housed within chassis 10 (e.g., backbone of the router). Communication plane 12 may be an example of a backplane or a mid-plane of an electronic device, such as a router or switch. Further example details of a router having a backplane and one or more mid-planes may be found in U.S. Pat. No. 8,054,619, the content of which is incorporated herein by reference.

As shown in the example of FIG. 1A, communication plane 12 includes a plurality of slots, illustrated as slots 14A-14E (collectively referred to as slots 14) and slots 16A-16T (collectively referred to as slots 16) for physically and electrically receiving one or more removable communication cards. Slots 14 and slots 16 include electrical connectors (e.g., pins) that allow communication cards of different types to electrically couple to communication plane 12. As one example, slots 14 include electrical connectors that allow for switch fabric cards to couple to communication plane 12, and slots 16 include electrical connectors that allow for physical interface cards (e.g., line cards) to couple to communication plane 12.

In some examples, there may be eight slots 16 and nine slots 14 for eight physical interface cards, and nine switch fabric cards. However, the techniques described in this disclosure are not limited to eight slots 16 and nine slots 14. There may be more or fewer slots 16 than eight, and there may be more or fewer slots 14 than nine. There may also be equal number of slots 14 and slots 16.

It should be understood that communication plane 12 is not limited to examples that require slots for different types of communication cards. In some examples, communication plane 12 may include slots that are common for different communication cards, or slots for only one type of communication card. In some examples, communication plane 12 may include more than two different types of slots for more than two different types of communication cards. The techniques described in this disclosure are applicable to all such examples. For ease of description and illustration, the techniques are described with examples where slots 14 include electrical connectors that allow communication cards of a first type to couple to communication plane 12, and where slots 16 include electrical connectors that allow communication cards of a second type to couple to communication plane 12.

Slots 14 and slots 16 are interconnected with transmission lines (e.g., copper traces or wires) that form part of the underlying communication plane 12. For example, communication plane 12 includes transmission lines that may provide coupling between each one of slots 16 to each one of slots 14. Each one of slots 14 need not necessarily be coupled to other ones of slots 14, but may be so coupled, and each one of slots 16 need not necessarily be coupled to other ones of slots 16, but may be so coupled.

An administrator or manufacturer of the electronic device 8 (e.g., a technician) may determine that communication cards are to be inserted in one or more of slots 14 and slots 16. For example, based on the particular operating environment in which device 8 is to be deployed and the particular needs of the customer, electronic device 8 may be configured with a particular number of switch fabric cards, physical interface cards, and service cards that provide one or more network services, such as firewall and intrusion detection services, network address translation, tunnel formation, or other network services. Once installed and operating, the communication cards in slots 14 and slots 16 communicate with one another via the transmission lines. That is, communication signals may be forwarded between the communication cards via the electrical interconnect provided by communication plane 12.

As one example, in FIG. 1A, a communication card (not separately shown) inserted with slot 16P is coupled to a communication card inserted with slot 14E with transmission line 18, and a communication card inserted with slot 16E is coupled to a communication card inserted with slot 14E with transmission line 20. Communication cards within the other slots 16 may be similarly coupled to slot 14E, as well as to slots 14A-14D. For ease of illustration, only the coupling of slot 16P and slot 16E to slot 14E is illustrated.

In communication plane 12, a large number of transmission lines may be needed to couple each of slots 16 to each of slots 14. Moreover, the transmission lines may be separate, distinct transmission lines (e.g., one transmission line does not connect to another transmission line). Such a requirement may result in complex transmission line routes that can potentially be undesirably long especially for highly dense examples of communication plane 12 (e.g., communication planes with many slots 14 and slots 16).

There may be a practical limit for how long the transmission lines can be on communication plane 12 based on the desired data rate for the signal to be conveyed along any particular one of the transmission lines. For example, the signals transmitted along the transmission lines may experience insertion loss or other signal degradation as the signals propagate from one end of the transmission lines to the other. Insertion loss is a measure of the loss of signal power due to the insertion of a receiving communication card in the path of the transmission line. The insertion loss may be a function of the length of the transmission line. For instance, the transmission line may function as a type of a low-pass filter, and the bandwidth and roll-off of the low-pass filter is based on the length of the transmission line.

The insertion loss of the transmission line may distort or otherwise corrupt the transmitted signal. For example, high-frequency components of the transmitted signal are attenuated more than low-frequency components of the transmitted signal. The insertion loss distortion causes a change in the amplitude of the signal, as well as jitter. Jitter is the difference between when a rising or falling edge occurs in an ideal signal and when the rising or falling edge actually occurs in the signal. In some cases, the insertion loss distortion (e.g., changes in amplitude or jitter) may be so large that the receiving communication card cannot differentiate between logic ones and logic zeros of the received signal, which in turn increases the bit-rate ratio beyond an acceptable ratio.

The amount of insertion loss that the signal experiences may also be a function of the data rate and the material of communication plane 12 (i.e., the material on which the transmission lines are formed). For example, high data rate signals (e.g., 10 gigabits per second (Gbps) or higher) experience more insertion loss over the same length of transmission line as compared to low data rate signals. Also, certain types of materials are more conducive for high data rate signals. For instance, communication plane 12 may be better suited for high data rates if communication plane 12 is formed with FR-4 material, as compared to other printed circuit board (PCB) materials.

In some examples, to address the insertion loss, communication cards coupled to slots 14 and slots 16 include redriver or retimer circuits. Redriver circuits include equalizers and amplifiers. The equalizer of the redriver circuit provides gain for the frequency components of the signal that were attenuated to reconstruct the transmitted signal. The amplifier of the redriver circuit amplifies the reconstructed signal. The retimer circuit may be similar to the redriver circuit, but may also include a clock-and-data recovery device (CDR). The CDR may remove the jitter caused by the insertion loss.

However, even with redriver or retimer circuits, there may be a practical limit for how long the transmission lines can be for a given data rate. For example, if the communication cards coupled to slot 14E and 16P operate at a first data rate (e.g., less than 10 Gbps), the length of transmission line 18 may be short enough that the redriver or retimer circuit of the communication cards are capable of compensating for the insertion loss or other types of loss cause by signals traversing transmission line 18.

However, if these communication cards are replaced with communication cares that operate at a second, different data rate (e.g., greater than or equal to 10 Gbps), then the length of transmission line 18 may be too long in that the redriver or retimer circuits of the communication cards may not be able to compensate for the insertion loss. In other words, for the second data rate, the insertion loss may be so great that the redriver and retimer circuits of the communication cards are incapable of correcting for the insertion loss. For example, for relatively high data rates (e.g., 10 Gbps or higher) and with FR-4 material, if the transmission line is longer than 30 inches, the redriver and retimer circuits may not be capable of correcting for the insertion loss.

In this manner, the practical limit on the length of transmission lines is a function of the data rates at which the communication cards operate. For some data rates, the transmission lines of communication plane 12 may be short enough such that the redriver or retimer circuits of the communication cards are able to compensate for any loss. For other, higher data rates, the transmission lines of communication plane 12 may be too long such that redriver or retimer circuits of the communication cards are not able to compensate for the loss.

Because there is a practical limit on the length of the transmission lines for a given data rate, there is a practical limit to the size of communication plane 12 and/or a limit to the number of slots 14 and slots 16 that communication plane 12 can support for that data rate. For example, one of slots 16 may be an obstruction in the direct path from another one of slots 16 to slots 14. This requires either removing the obstructing one of slots 16 or increasing the length of the transmission line to bypass around the obstructing one of slots 16, neither of which may be desirable. For instance, in FIG. 1A, there are intervening slots 16 that obstruct a direct transmission line from slot 16P to slot 14E, which requires transmission line 18 to be longer. In some cases, it may be possible that transmission line 18 becomes too long (e.g., beyond the practical limitations of the length of transmission line 18) for a given rate, but may be short enough for other, lower data rates. Accordingly, in the example of FIG. 1A, there is a limit to the size of communication plane 12 and a limit to the number of slots 14 and slots 16 or other obstructing components that communication plane 12 can support, while still allowing communication cards that couple to slots 14 and slots 16 to communicate with one another.

In FIG. 1A, transmission line 18 is illustrated in dashed line to indicate that for certain data rates, transmission line 18 may be short enough such that the communication cards coupled to slots 14E and 16P are capable of compensating for the signal degradation caused by the insertion loss or other types of losses, but may be too long for certain data rates such that the communication cards cannot compensate for the signal degradation. In accordance with the techniques described in this disclosure, in some examples, rather than outputting signals along transmission line 18, the communication cards coupled to slot 14E and 16P may output signals along transmission lines 24B and 24A, respectively.

As illustrated in FIG. 1A, communication plane 12 includes transmission lines 24A and 24B. The length of each one of transmission lines 24A and 24B may be less than the total length of transmission line 18. In the techniques described in this disclosure, a pluggable module, such as pluggable module 22 of FIG. 1B, couples to communication plane 12. When the pluggable module is coupled to communication plane 12, the communication cards coupled to slots 14E and 16P may not output signals along transmission line 18. Rather, the communication cards coupled to slots 14E and 16P may output signals via transmission lines 24B and 24A, respectively. The signals are fed off of communication plane 12 and into the pluggable module. The pluggable module receives the signals and compensates for any loss, as described in more detail below, and feeds the signals back onto communication plane 12.

The pluggable module may allow for the in-the-field upgrades without needing to replace communication plane 12. For example, assume communication plane 12 includes transmission line 18 and transmission lines 24A and 24B. In this example, when the communication cards operate at a lower data rate, the communication cards may transmit signals along transmission line 18. During an upgrade, a user (e.g., a technician) may remove the communication cards and replace the communication cards with cards that operate at a higher data rate. In this example, transmission line 18 may be too long, and so the communication cards transmit signals along transmission lines 24A and 24B that the pluggable module receives. The pluggable module compensates for the loss, and transmits the signal to the communication cards.

Because each one of transmission lines 24A and 24B may be shorter than transmission line 18, the communication cards may be able to compensate for any additional loss. In some examples, the any additional loss may be small enough that the communication cards are able to compensate for the loss without needing retimer or redriver circuits. For example, the amplitude loss and jitter may be minor, and may not cause an increase in the bit-error ratio or an increase beyond an acceptable amount.

In some examples, the communication cards may be configured to determine whether a pluggable module is coupled to the ends of transmission lines 24A and 24B, and in response, transmit signals along transmission lines 24A and 24B when determined that the pluggable module is coupled. In this way, the pluggable module receives signals from a transmitting communication card, compensates for any loss in the middle of the transmission of the signal, and relays the compensated signal back to the receiving communication card.

In some examples, communication plane 12 may not even include transmission line 18. In these examples, the communication cards coupled to slots 14E and 16P may be configured to always transmit signals along transmission lines 24B and 24A, respectively. The pluggable module may compensate for losses experienced by the signals and relay the signals as described above. For in-the-field upgrades, for this example, the user may remove the current pluggable module, and replace the pluggable module with a pluggable module configured to operate at the higher data rate.

FIG. 1B illustrates electronic device 8 which includes pluggable module 22 coupled to communication plane 12. As illustrated, one or more pluggable modules, one example of which is pluggable module 22, couple at the termination points of transmission lines 24A and 24B. In accordance with the techniques described in this disclosure, the one or more pluggable modules receive the transmitted signals from a transmitting communication card, compensate for the insertion loss and any other types of losses to generate a reconstructed signal, and transmit the reconstructed signal to a receiving card. In other words, the one or more pluggable modules provide intermediate reconstruction of the signal along the transmission path and relay the reconstructed signal. In this way, the total transmission path may be longer than the practical length of a transmission line, but the signal never experiences insertion loss or any other types of loss that cannot be compensated because of the intermediate reconstruction of the signal.

For example, as illustrated in FIG. 1B, slot 16P is coupled to transmission line 24A. Transmission line 24A terminates at the edge of communication plane 12. Connector 26A of pluggable module 22 couples to the termination of transmission line 24A at the edge of communication plane 12. On the other end of pluggable module 22, connector 26B of pluggable module 22 couples to the termination of transmission line 24B at the edge of communication plane 12. Transmission line 24B couples to slot 14E.

Connectors 26A and 26B of pluggable module 22 may be considered as input/output interfaces of pluggable module 22. For example, when the communication card coupled to slot 16P transmits a signal, connector 26A is an input interface of pluggable module 22. In this example, pluggable module 22 transmits the reconstructed signal via connector 26B, which is an output interface of pluggable module 22. In the reverse, when the communication card coupled to slot 14E transmits a signal, connector 26B is an input interface of pluggable module 22. In this example, pluggable module 22 transmits the reconstructed signal via connector 26A, which is an output interface of pluggable module 22.

In some examples, connectors 26A and 26B may be electrical connectors. For example, connectors 26A and 26B may be slots that electrically couple transmission lines 24A and 24B to pluggable module 22. In some examples, in addition to providing electrical connection, connectors 26A and 26B may be mechanical connectors. For example, a technician may connectors 26A and 26B may mechanically couple pluggable module 22 to communication plane 12 so that pluggable module 22 is removably affixed to communication plane 12.

The length of transmission line 24A plus the length of transmission line 24B may be greater than or equal to the length of transmission line 18. However, the length only of transmission line 24A and the length only of transmission line 24B is less than the length of transmission line 18.

The communication card (e.g., a physical interface card, a service card, or a line card) coupled to slot 16P transmits a signal along transmission line 24A, and the signal experiences insertion loss based on the length of transmission line 24A. The signal exits off of communication plane 12 onto pluggable module 22 via connector 26A (i.e., the input interface in this case). Circuits within pluggable module 22 compensate for the insertion loss and any other loss (e.g., due to the coupling via connector 26A) that the signal experiences and generates a reconstructed signal. In this example, the length of transmission line 24A is short enough that pluggable module 22 is capable of compensating for the loss.

The reconstructed signal may be substantially similar to the signal that the communication card coupled to slot 16P transmitted. In some examples, if pre-compensation is applied, the reconstructed signal may be different than the signal that the communication card coupled to slot 16P transmitted, as described in more detail below. Pluggable module 22 outputs the reconstructed signal to transmission line 24B via connector 26B (i.e., the output interface in this case). In this manner, the signal reenters communication plane 12, and travels along transmission line 24B to the communication card (e.g., a fabric switch card) coupled to slot 14E. In other words, pluggable module 22 receives a signal off of communication plane 12, compensates for any loss, and relays the signal back onto communication plane 12.

The retimer circuit and/or redriver circuit within the communication card coupled to slot 14E compensates for any loss experienced due to the signal traveling along transmission line 24B. For example, the length of transmission line 24B is short enough that the communication card coupled to slot 14E is capable of compensating for the experienced loss. As described in more detail, in some examples, the communication cards need not necessarily include retimer and/or redriver circuits.

In the reverse, the communication card coupled to slot 14E transmits a signal along transmission line 24B that exits off of communication plane 12 and onto pluggable module 22 by the coupling of connector 26B (i.e., the input interface) to the termination of transmission line 24B at the edge of communication plane 12. Pluggable module 22 compensates for any loss and transmits the reconstructed (e.g., compensated) signal back onto communication plane 12 via the coupling between connector 26A (i.e., the output interface) to the termination of transmission line 24A at the edge of communication plane 12. The communication card coupled to slot 16P then receives the signal, and compensates for any loss experienced due to the signal traveling along transmission line 24A.

In the techniques described in this disclosure, not all slots 14 and slots 16 need to be coupled to pluggable modules. If the distance between one of slots 14 and one of slots 16 is small enough for a given data rate, the communication cards coupled to the respective ones of slots 14 and slots 16 may transmit signals directly to one another via a transmission line. For example, in communication plane 12, slot 14E and slot 16E are proximate enough to one another such that any loss that the transmitted signal experiences can be compensated locally by the receiving communication card for a given data rate. For instance, similar to FIG. 1A, slot 14E and slot 16E can be coupled to one another via transmission line 20. The length of transmission line 20 may be small enough that any loss in the signals transmitted along transmission line 20 can be compensated by the communication cards coupled to slot 14E and slot 16E.

As described above, one or more pluggable modules may couple to communication plane 12. For example, the transmission path between slot 16P and slot 14E includes pluggable module 22. In some examples, the transmission path between slot 16T and slot 14A includes a second pluggable module, where the second pluggable module couples to the termination points of the transmission lines that extend from slot 16T and slot 14A. In some examples, pluggable module 22 is intermediate in the transmission path from slot 16P to slot 14E and intermediate in the transmission path from slot 16T to slot 14A.

As described in more detail, the one or more pluggable modules include retimer and/or redriver circuits that compensate for the loss and transmit reconstructed signals. In this disclosure, retimer and/or redriver circuits of a pluggable module are referred to commonly as compensating circuits. The reconstructed signals that the pluggable modules transmit may be referred to as retimed signals in examples where the compensating circuit is a retimer circuit. In this manner, the one or more pluggable modules may be considered as reducing un-retimed length of the signals on communication plane 12. The one or more pluggable modules may be placed anywhere along the transmission path, but generally should be placed in locations that minimize the un-retimed length of the signals.

The one or more pluggable modules are pluggable in the sense that they can be easily removed from communication plane 12. For example, the tension between the coupling of connectors 26A and 26B to transmission lines 24A and 24B, respectively, may be sufficient to keep pluggable module 22 plugged to communication plane 12. In some examples, pluggable module 22 may be affixed (e.g., with screws) to chassis 10. For example, connectors 26A and 26B may include holes that receive screws that keep pluggable module 22 affixed to communication plane 12 and to chassis 10. In any of these examples, a technician or user may be able to remove the pluggable modules from chassis 10 and communication plane 12 with relative ease.

In some examples, connectors 26A and 26B may be connected to communication plane 12, and pluggable module 22 couples to communication plane 12 via connectors 26A and 26B. In these examples, the tension provided by connectors 26A and 26B may be sufficient to keep pluggable module 22 in place. The technician or user can remove pluggable module 22 from communication plane 12 by removing pluggable module 22 from connectors 26A and 26B.

There may be various advantages in the pluggability of the pluggable modules. For example, it may be possible to place compensating circuits (e.g., retimer and/or redriver circuits) directly on communication plane 12 within the transmission paths of slots 14 and slots 16. However, this requires including active components (e.g., components that require power for operation) directly on communication plane 12. The inclusion of active components increases the likelihood of malfunction. In other words, the inclusion of active components directly on communication plane 12 increases the mean-time-before-failure (MTBF) of communication plane 12. In general, the removal and replacement of communication plane 12 is difficult, and therefore any increase in the MTBF should be avoided.

With pluggable modules, such as pluggable module 22, there may be little to no effect on the MTBF of communication plane 12. For example, because the pluggable modules are external and separate from communication plane 12, no active components are added to communication plane 12. Accordingly, the pluggable modules compensate for the loss experienced by the signals without affecting the MTBF of communication plane 12.

Also, the compensating circuits may be configured to function for a specific data rate. If the compensating circuits are formed on communication plane 12, communication plane 12 may only function at the specific data rate of the compensating circuits. Accordingly, communication plane 12 may not be scalable for different data rates if the compensating circuits are formed directly on communication plane 12.

In some examples, communication plane 12 may include transmission lines that interconnect slots 14 and slots 16 together, and include transmission lines that extend from slots 14 and slots 16 to a termination point on communication plane. For example, communication plane 12 may include transmission line 18 and transmission lines 24A and 24B. In this example, transmission line 18 provides one path between slot 14E and slot 16P, and the combination of transmission line 24A, pluggable module 22, and transmission line 24B provides another path between slot 14E and slot 16P.

In this example, if pluggable module 22 is not coupled to communication plane 12, then the communication cards coupled to slots 14E and 16P transmit data to and receive data from one another via transmission line 18. The insertion of pluggable module 22 on communication plane 12 may automatically redirect the communication cards coupled to slots 14E and 16P, in this example, to transmit data to and receive data from one another via transmission lines 24A and 24B and pluggable module 22.

As one example, the communication cards may determine, with firmware loaded into the communication cards, whether pluggable module 22 is coupled to communication plane 12. If the communication cards determine that pluggable module 22 is coupled to communication plane 12, then the communication cards transmit data through pluggable module 22 (e.g., via transmission lines 24A and 24B). If the communication cards determine the pluggable module 22 is not coupled to communication plane 12, then the communication cards transmit data through transmission lines on communication plane 12 that directly interconnect slots 14 and slots 16 (e.g., transmission line 18, which is fully internal to communication plane 12).

As another example, the coupling of pluggable module 22 to communication plane 12 may cause switches within slots 14 and slots 16 or coupled to slots 14 and slots 16 to toggle causing any transmitted data and any received data to travel through pluggable module 22. When pluggable module 22 is not coupled to communication plane 12, the switches may toggle causing any transmitted data and any received data to travel through internal transmission lines of communication plane 12 that directly interconnect slots 14 and slots 16 (e.g., without having to exit the signal off of communication plane 12). In this example, no modification to the communication cards may be needed.

There may be other techniques for determining that pluggable module 22 is coupled to communication plane 12, and the techniques described in this disclosure are not limited to the above examples. In some examples, if pluggable module 22 is coupled to communication plane 12, the coupling of pluggable module 22 to communication plane causes the transmitted signal to be redirected (e.g., by the communication cards determining that pluggable module 22 is coupled or by the toggling of the switches) from a transmission line that directly interconnects slots 14 to slots 16 to transmission lines that couple to pluggable module 22.

Examples in which signals are redirected (e.g., re-routed) based on whether pluggable module 22 is coupled to communication plane 12 may further promote in-the-field upgrades. For example, when communication cards that operate at a first data rate are coupled to slots 14 and slots 16, the user may not install pluggable module 22. In this case, the communication cards transmit and receive data via transmission lines that directly connect slots 14 and slots 16 to one another (e.g., there is no break in the transmission line that requires signals to exit off of communication plane 12).

When an upgrade is desired to communication cards that operate at a second data rate, it may be possible that one or more of the transmission lines that directly interconnect slots 14 and slots 16 are too long (e.g., the loss may be too great for the communication cards to compensate). In this case, the user couples one or more pluggable modules that operate that the second data rate to communication plane 12, and the upgraded communication cards. One or more of the communication cards may then communicate with one another via the one or more pluggable modules, which allows the in-the-field upgrade without the user needing to replace communication plane 12 or purchase a new electronic device (e.g., a new router).

In the techniques described in this disclosure, the pluggable modules are easily removed and can be easily replaced. For example, pluggable module 22 may be configured to function for a particular data rate (e.g., 10 Gbps). If communication plane 12 is to be used in a system with a different data rate (e.g., 40 Gbps), communication plane 12 may be coupled to a different pluggable module configured to function at the desired data rate. This allows for in-the-field upgrade where a user (e.g., a technician) can open chassis 10, access communication plane 12, replace pluggable module 22 with a different pluggable module, as well as replace any of the communication cards with communication cards that function at the desired data rate.

In accordance with the techniques described in this disclosure, the one or more pluggable modules allow for slots 14 and slots 16 to be placed further apart in a larger sized communication plane. For example, rather than the transmission lines traversing the entirety of the communication plane, one or more of the transmission lines can terminate at an edge of the communication plane. The signals are then transmitted off of the communication plane, retimed by the one or more pluggable modules, and transmitted back onto the communication plane. Moreover, support for the larger sized communication plane, thus allowing more communication cards to be used, may be made in the field merely by installation of pluggable module 22.

In the techniques described in this disclosure, each communication plane may be capable of supporting more communication cards (i.e., more slot density). For example, whereas the slots for the communication cards may form obstructions that cause the transmission lines to be undesirably long, the pluggable modules, in the techniques described in this disclosure, bypass the obstructions by being external to the communication plane, and allow for shorter length snippets of transmission lines.

The pluggability of the pluggable modules allows for high-throughput, high-reliable, low-fault rate communication planes. For example, because pluggable modules are easily replaceable, the communication planes can be scalable for different data rates. For instance, while 30 inches may be the practical limit for the length of the transmission lines for 10 Gbps, 20 inches may be the practical limit for the length of the transmission lines for 40 Gbps. In this example, it may be possible to design the communication planes such that no transmission line that couples to a pluggable module is greater than 10 inches, and any slots that placed at a distance greater than 10 inches communicate with one another via transmission lines that are shorter than 10 inches and coupled through a pluggable module. In this case, the communication planes are easily scalable to 40 Gbps simply by replacing the pluggable modules with pluggable modules configured to function at 40 Gbps.

Figure 2:
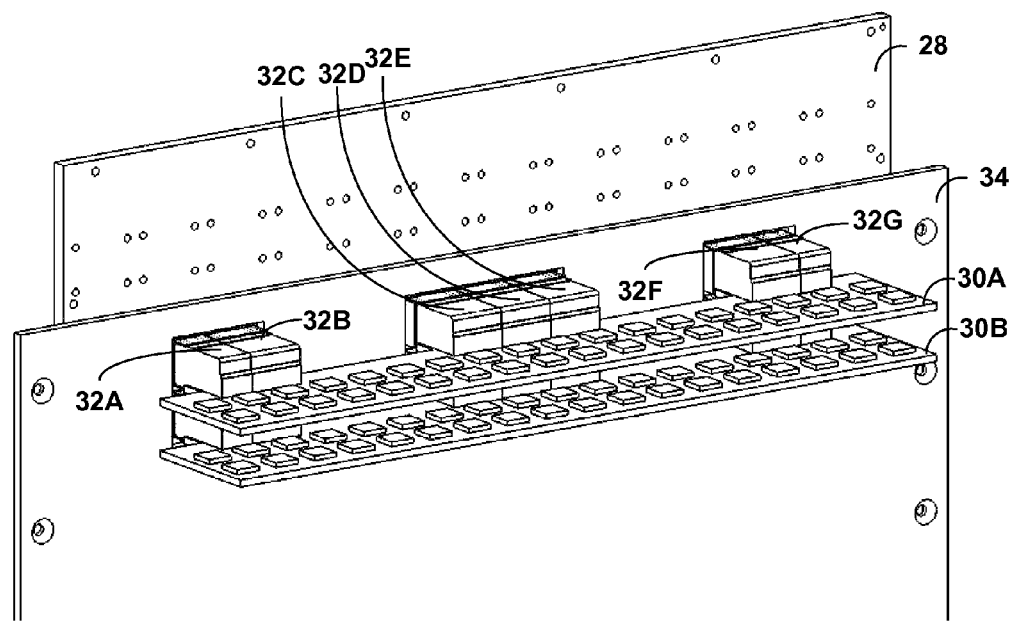
FIG. 2 is a schematic diagram illustrating a perspective view of a portion of an electronic device having a set of pluggable modules removably coupled to an internal communication plane.

FIG. 2 is a schematic diagram illustrating a perspective view of a portion of an electronic device having a set of pluggable modules removably coupled to an internal communication plane 28, which may be similar to communication plane 12 of FIGS. 1A and 1B. For example, communication plane 28 may be a mid-plane. In some examples, communication plane 28 may be a back-plane coupled to a plurality of removable mid-planes. The transmission lines and the slots of communication plane 28 are on the opposite side from the illustrated side.

In FIG. 2, pluggable modules 30A and 30B are removably coupled to communication plane 28. For example, pluggable module 30A is coupled to connectors 32A-32G (collectively referred to as connectors 32), and pluggable module 30B may be similarly coupled to connectors that are not illustrated. Connectors 32 may be similar to connectors 26A and 26B (FIG. 1B), and may form as the input/output interface of pluggable module 30A. For example, connectors 32A and 32B and connectors 32F and 32G couple to transmission lines that are connected to slots for fabric switch cards on opposite ends of communication plane 28. Connectors 32C, 32D, and 32E couple to transmission lines that are connected to slots for line cards on communication plane 28 (e.g., physical interface cards and service cards).

In some examples, connectors 32 may be considered as part of pluggable module 30A. In some examples, connectors 32 may be separate from pluggable module 30A. In these examples, pluggable module 30A may include input and output interfaces that couple to connectors 32.

In some examples, communication plane 28 may include connectors 32. For example, connectors 32 may be located at connection points of the one or more transmission lines of communication plane 28. In these examples, connectors 32 provide a socket for receiving the input and output interface of pluggable module 30A. For example, one or more of the transmission lines of communication plane 28 may end at where connectors 32 are connected to communication plane 28. The ends of the one or more transmission lines may be the connection points of the transmission lines where connectors 32 couple. In some examples, connectors 32 provide a socket (e.g., an electrical socket) for receiving the input interface of pluggable module 30A and the output interface of pluggable module 30A.

Board 34 is an optional board (e.g., a metallic board that is not electrically coupled to communication plane 12 and pluggable modules 30A and 30B) that provides additional support for connectors 32. For example, board 34 connects (e.g., screws) into the chassis that holds communication plane 28. In this way, connectors 32 are extra secure within the chassis, and board 34 reduces the mechanical stress on connectors 32 holding pluggable module 30A in place. Board 34 is not needed in every example, and is illustrated for purposes of example only.

Pluggable module 30A can be easily removed from connectors 32. For example, the tension of connectors 32 may be sufficient to keep pluggable module 30A in place, and a user (e.g., a technician) can remove pluggable module 30A from connectors 32 with relatively ease. In some examples, pluggable module 30A may be further screwed into or affixed in some additional manner to connectors 32, board 34, and/or the chassis. However, even in these examples, the user may be able to remove pluggable module 30A with relative ease. Pluggable module 30B may be similarly removable from respective connectors.

The square protrusions on pluggable modules 30A and 30B are the compensating circuits (e.g., retimer and/or redriver circuits) that compensate for loss and generate reconstructed signals. For example, assume that the distance between a slot into which a fabric switch card couples and a slot into which a physical interface card couples is greater than desired (e.g., due to obstructions in the path or due to the size of communication plane 28). In this example, rather than the fabric switch card transmitting a signal to the physical interface card via a transmission line on communication plane 28, the fabric switch card transmits the signal via a transmission line coupled to connector 32A. The signal transmits off of communication plane and onto pluggable module 30A via connector 32A (e.g., via an input interface). The compensating circuits of pluggable module 30A reconstruct the signal (i.e., compensate for any loss), and transmit the reconstructed signal. The reconstructed signal enters back onto communication plane 28 via connector 32C (e.g., via an output interface), where connector 32C is coupled to the receiving line card via a transmission line on communication plane 28.

FIGS. 3A-3D are block diagrams illustrating example processing flow within pluggable modules. For example, FIGS. 3A-3D illustrate examples of one or more circuits of a pluggable module that compensate for loss experienced by the signal traveling along the transmission lines of a communication plane.

Figure 3A:
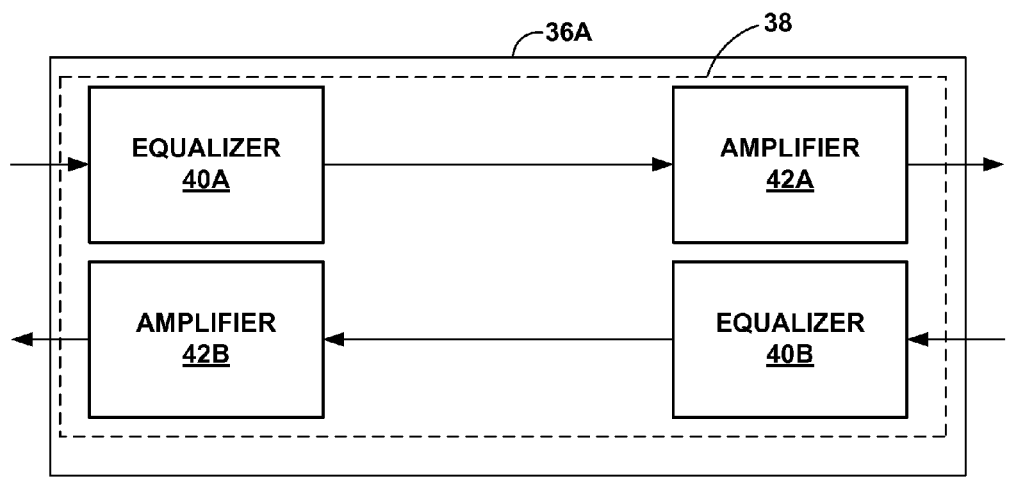

FIG. 3A illustrates pluggable module 36A, which may be similar to pluggable modules 22, 30A, and 30B. Pluggable module 36A includes redriver circuit 38, which is one example of a compensating circuit. Redriver circuit 38 includes equalizers 40A and 40B and amplifiers 42A and 42B. Equalizer 40A receives a transmitted signal from a first communication card, via an input interface, and compensates for the insertion loss by providing gain to the frequencies that were attenuated due to the insertion loss. In this example, the output of equalizer 40A is a compensated signal that is similar to the transmitted signal. Amplifier 42A receives the compensated signal, amplifies the compensated signal to generate a reconstructed signal, and transmits the reconstructed signal to a second communication card, via an output interface. In the reverse, the second communication card transmits a signal to equalizer 40B, via an input interface. Equalizer 40B functions similar to equalizer 40A, and equalizer 40B transmits a compensated signal to amplifier 42B. Amplifier 42B amplifies the compensated signal and transmits the reconstructed signal to the first communication card, via an output interface. In this manner, redriver circuit 38 provides for bi-directional compensation.

Figure 3B:
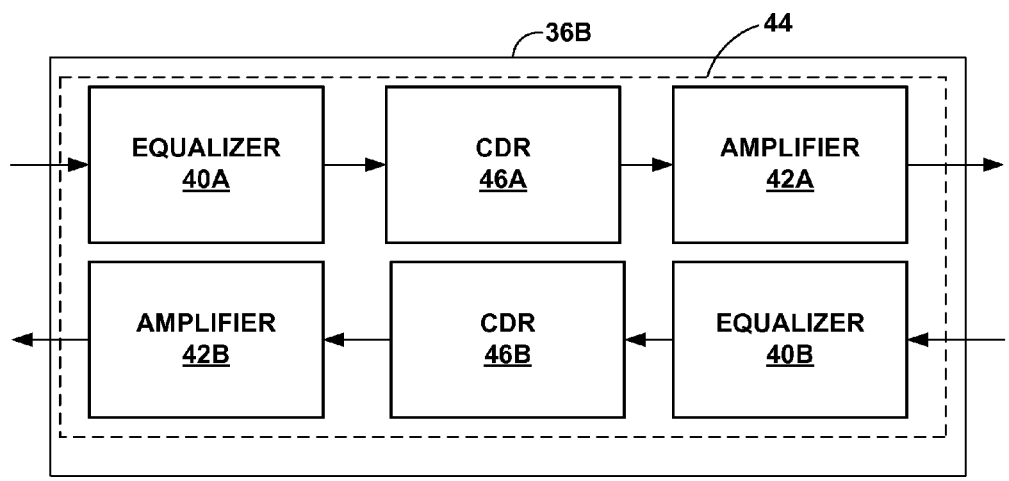

FIG. 3B illustrates pluggable module 36B, which is similar to pluggable module 36A, but includes a retimer circuit 44. Retimer circuit 44 is one example of a compensating circuit. For example, retimer circuit 44 includes equalizers 40A and 40B and amplifiers 42A and 42B, but also includes clock-and-data recovery (CDR) circuits 46A and 46B. CDRs 46A and 46B are configured to retime respective signals. For example, equalizers 40A and 40B may not be able to compensate for all of the insertion loss, and the remaining insertion loss may add jitter to the signal that equalizers 40A and 40B output.

CDRs 46A and 46B are configured to lock onto the signal outputted by equalizers 40A and 40B, respectively, and generate a clock signal. With the generated clock signal, CDRs 46A and 46B resample the signal outputted by equalizers 40A and 40B, and output a signal that does not suffer from the jitter. In this sense, CDRs 46A and 46B may be considered as retiming respective signals. Amplifiers 42A and 42B receive the retimed signals from CDRs 46A and 46B, amplify the signals, and transmit the reconstructed signals to respective first and second communication cards.

FIG. 3C illustrates pluggable module 36C, which includes redriver circuit 48. Redriver circuit 48 is one example of a compensating circuit. Redriver circuit 48 is similar to redriver circuit 38, but includes pre-compensators 50A and 50B. Pre-compensators 50A and 50B are configured to pre-compensate the reconstructed signal prior to transmission via respective output interfaces. For example, as described above, one effect of insertion loss is the attenuation of the higher frequency signal components. Pre-compensators 50A and 50B are configured to boost the higher frequency signal components that will experience the attenuation. In this way, prior to the communication card receiving the signal, the pre-compensated signal will experience the insertion loss of the transmission line that couples to the communication card. However, due to the pre-compensation, the signal that the communication card receives may be substantially similar to the originally transmitted signal. In other words, the insertion loss from the transmission line undoes the pre-compensation such that the received signal is substantially similar to the originally transmitted signal.

FIG. 3D illustrates pluggable module 36D, which includes retimer circuit 52. Retimer circuit 52 is a combination of redriver circuit 48 and retimer circuit 44, and is one example of a compensating circuit. For example, retimer circuit 52 includes equalizers 40A and 40B, amplifiers 42A and 42B, CDRs 46A and 46B, and pre-compensators 50A and 50B. In FIG. 3D, retimer circuit 52 retimes and pre-compensates the signal prior to transmission to respective communication cards.

Although FIGS. 3A-3D illustrate pluggable modules 36A-36D with one redriver circuit 38, one retimer circuit 44, one redriver circuit 48, and one retimer circuit 52, respectively, aspects of this disclosure are not so limited. In some examples, a pluggable module includes a plurality of redriver circuits and a plurality of retimer circuits. For example, pluggable module 36A may include a plurality of redriver circuits, each similar to redriver circuit 38, and pluggable module 36D may include a plurality of retimer circuits, each similar to retimer circuit 52.

In some examples, one pluggable module may include a plurality of different redriver circuits and/or different retimer circuits. For instance, a first pluggable module includes a plurality of redriver circuits 38 and a plurality of retimer circuits 44. A second pluggable module includes a plurality of redriver circuits 48 and a plurality of retimer circuits 52. A third pluggable module includes a plurality of redriver circuits 38, redriver circuits 48, retimer circuits 44, and retimer circuits 52. Other combinations are possible, and the techniques described in this disclosure are extendable to each such combination.

Moreover, although equalizers 40A and 40B, amplifiers 42A and 42B, CDRs 46A and 46B, and pre-compensators 50A and 50B are illustrated as separate components, the techniques described in this disclosure are not so limited. In some examples, equalizers 40A and 40B may be formed in a first integrated circuit (IC), amplifiers 42A and 42B may be formed in a second IC, CDRs 46A and 46B may be formed in a third IC, and pre-compensators 50A and 50B may be formed in a fourth IC. In some examples, equalizer 40A, amplifier 42A, CDR 46A, and pre-compensator 50A may be formed in a first IC, and equalizer 40B, amplifier 42B, CDR 46B, and pre-compensator 50B may be formed in a second IC. In general, any two or more of equalizers 40A and 40B, amplifiers 42A and 42B, CDRs 46A and 46B, and pre-compensators 50A and 50B may be formed together in an IC.

As described above, in some examples, the communication cards include redriver and/or retimer circuits to compensate for the insertion loss. In some example techniques, the communication cards need not include redriver and/or retimer circuits. For example, because the pluggable modules reconstruct the signal midway, the signal that the receiving card receives may be sufficiently similar to the originally transmitted signal that no additional compensation is needed.

As one example, the transmission line that extends from redriver circuit 38 or retimer circuit 44 may be short enough that the amount of insertion loss is minimal. In this example, the receiving communication card may be able to process the compensated signal and may not need to compensate for the insertion loss, and therefore, no redriver or retimer circuit on the communication card may be necessary. As another example, even if the transmission line that extends from redriver circuit 48 or retimer circuit 52 is relatively long, pre-compensators 50A and 50B may pre-compensate for the insertion loss that the signal outputted from redriver circuit 48 or retimer circuit 52 will experience. In this example, there may not be any insertion loss that needs to be compensated for, and therefore, the receiving communication card can process the received signal without needing to include redriver or retimer circuits.

In some cases, components of the communication cards may be densely packed on the communication cards. In some of the examples described in this disclosure, by compensating for the insertion loss on the pluggable module, it may be possible to remove the redriver and/or retimer circuits on the communication cards. This in turn frees space on the communication cards, which allows for additional components to be placed on the communication cards, or allows for the size of the communication card to be smaller.

Figure 4:
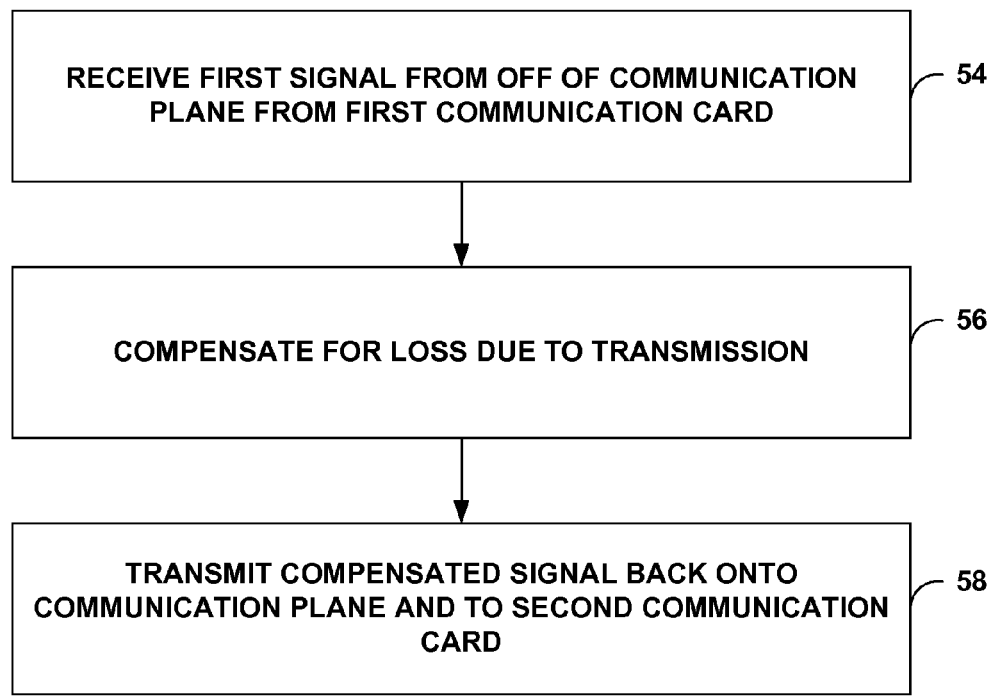
FIG. 4 is a flowchart illustrating techniques in accordance with one or more examples described in this disclosure.

FIG. 4 is a flowchart illustrating techniques in accordance with one or more examples described in this disclosure. For purposes of illustration reference is made to the components of FIGS. 1A, 1B, 2, and 3A-3D. For example, a pluggable module (e.g., pluggable module 22, 30A, 30B, or 36A-36D) receives a signal from off of a communication plane (e.g., communication plane 12 or communication plane 28) (54).

In this example, the signal is transmitted by a first communication card along a first transmission line of the communication plane. Also, the pluggable module is external to the communication plane and removably coupled to the communication plane. For example, the pluggable module is removably coupled to the communication plane with connectors coupled to the communication plane.

The pluggable module compensates for at least one of loss experienced by the signal due to the transmission along the first transmission line and loss that will be experienced due to transmission along the second transmission line (56). As one example, the pluggable module may equalize to compensate for part of the loss experienced by the signal. As another example, the pluggable module may equalize to compensate for part of the loss experienced by the signal, and retime (e.g., with a CDR) to compensate for an additional part of the loss experienced by the signal. As yet another example, the pluggable module may pre-compensate for the loss that the signal will experience due to the transmission along the second transmission line. As yet another example, the pluggable module may compensate for the loss experienced due to the transmission along the first transmission line and compensate for the loss that will be experienced due to the transmission along the second transmission line.

The pluggable module transmits the compensated signal back onto the communication plane and to a second communication card along a second transmission line of the communication plane (58). In some examples, the second communication card processes the compensated signal without retiming the compensated signal.

Figure 5:
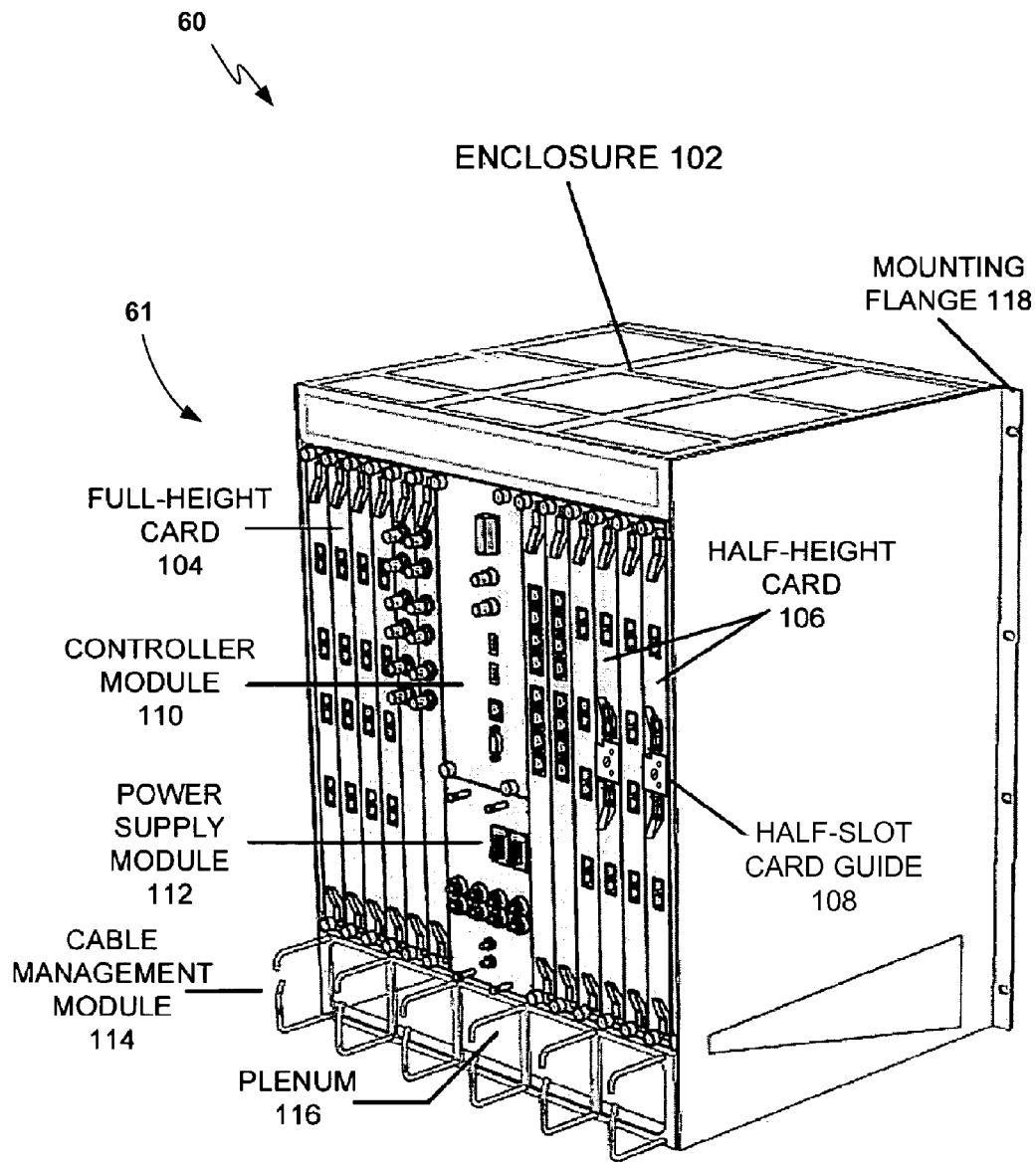
FIG. 5 illustrates an electronic device including a card cage capable of accepting communication cards.

FIG. 5 illustrates electronic device 60, which includes card cage 61. Electronic device 60 may be similar to electronic device 8 (FIGS. 1A and 1B). For instance, one example of electronic device 60 is a router such as for the Internet or a local area network (LAN). Electronic device 60 is one example of an electronic device in accordance with the techniques described in this disclosure. The techniques described in this disclosure should not be considered limited to the example electronic device 60 of FIG. 5, and can be extended to other examples of routers, or generally to other types of electronic devices.

Card cage 61 provides a plurality of slots, such as slots 14 and slots 16 (FIGS. 1A and 1B) capable of removable electronic communication cards. As one example, the electronic communication cards may be a full-height card (such as full-height card 104) that occupies an entire slot, or a half-height card (such as half-height card 106). Full-height card 104 and half-height card 106 are examples of communication cards that couple to slots 14 and/or slots 16. It should be understood that the techniques described in this disclosure do not require both half-height cards and full-height cards, and such description is provided for purposes of example only.

In the example illustrated in FIG. 5, electronic device 60 includes enclosure 102, a full-height card 104, a half-height card 106, a half-slot card guide 108, controller module 110, power supply module 112, cable management module 114, plenum 116 and mounting flange 118. Enclosure 102 may include a chassis such as chassis 10. Enclosure 102 may be fabricated from combinations of metal, plastic and/or composite and may be sized for any particular application. In one example, enclosure 102 may be sized to fit an industry-standard mounting structure, such as an equipment rack.

Enclosure 102 includes mounting flange 118 to facilitate attachment of enclosure 102 to a mounting structure, such as an equipment rack. Mounting flange 118 includes one or more mounting holes for accepting fasteners, such as machine screws, for use in attaching electronic device 60 to a mounting structure.

Full-height card 104 and half-height card 106 may include any device(s) and/or component(s) that are configured to operate when installed within slots of card cage 61. As used herein when referring to cards, the term "height" denotes a length associated an edge of a card in a direction parallel with the slot in which the card is installed, regardless of whether in a vertical orientation, a horizontal orientation, and/or another orientation. Full-height card 104 and/or half-height card 106 may be removably coupled to electronic device 60 using fasteners, catches, and/or other retaining mechanisms. The cards are configured to have a predetermined height and/or depth so as to be retained by a chassis and/or half-slot card guide 108 inside electronic device 60. In one example, full-height card 104 may have dimensions about 15 inches high by approximately 8 inches deep, whereas half-height card 106 may have dimensions about 7 inches high by approximately 8 inches deep.

Full-height card 104, half-height card 106 and/or other types of partial-height cards are configured to perform certain functions using a combination of hardware and/or software components. In one example, full-height card 104, half-height card 106 and/or other types of partial-height cards are configured to perform packet forwarding, network address translation, data encryption, data processing, and/or data storage using hardware and/or software components.

Half-slot card guide 108 is configured to couple two or more partial-height cards into an assembly that can be configured and adapted to fit into a chassis slot within enclosure 102. As an example, half-slot card guide 108 may be an elongated apparatus having a height about one inch, a width about 1 inch, and a depth about 8 inches. In this example, the combined height of half-slot card guide 108 and two half-height cards 106 is equal to the height of a single full-height card 104. When mounted within an open slot, half-slot card guide 108 provides guide means and structural support necessary for two half-height cards 106 to be installed and received by electronic device 60.

Controller module 110 is configured to control and/or monitor the operation of one or more cards operating in electronic device 60. In this example, controller module 110 includes a special-purpose computer mounted on a full-height card 104 so as to occupy a full-height slot in a chassis within electronic device 60. In another example, controller module 110 may have a different dimension, such as for mounting in a partial-height card slot or in a dedicated portion of electronic device 60.

Power supply module 112 provides power to devices operating in electronic device 60. Power supply module 112 is configured to perform voltage and/or current conversion and includes one or more inputs and/or outputs. In one example, power supply module 112 may accept an alternating current (AC) from a wall receptacle and provide a direct current (DC) to devices operating within electronic device 60.

Cable management module 114 is configured to retain and/or manage cables. In one example, cable management module 114 includes guides and/or channels for retaining wires and/or optical fibers associated with fill-height card 104, half-height card 106, controller module 110 and/or power supply module 112.

Plenum 116 facilitates and/or directs airflow through electronic device 60. In one example, plenum 116 includes one or more openings, or channels, for accepting an input air volume and directing the input air volume across interior portions of full-height card 104, half-height card 106, controller module 110 power supply module 112, and/or other devices, components and/or cards.

In accordance with the techniques described in this disclosure, full-height card 104 and/or half-height card 104 may couple to slots of a communication plane of electronic device 60. One or more pluggable modules may couple to the communication plane of electronic device 60. When an upgrade to electronic device 60 is desired, the user may remove full-height card 104 and/or half-height card 106 and replace such cards with communication cards that operate at a higher data rate. The user may replace or couple one or more pluggable modules to one or more communication planes of electronic device 60 to all for the communication card to communicate (i.e., transmit and receive data) with one another.

The techniques of this disclosure may be implemented in a wide variety of devices or apparatuses, including line-cards, routers, optical interfaces, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units.

Various examples have been described. These and other examples are within the scope of the following claims.

The invention claimed is:
1. An electronic device comprising:
a plurality of removable communication cards;
a communication plane having a set of slots that provide electrical interfaces for receiving the plurality of removable communication cards, wherein the communication plane includes a first transmission line, of a plurality of transmission lines formed on or within the communication plane, along which a first one of the communication cards transmits an electrical signal and a second transmission line, of the plurality of transmission lines formed on or within the communication plane, along which a second one of the communication cards receives a compensated version of the electrical signal; and
a pluggable module that is removably coupled to and external from the communication plane, wherein the pluggable module comprises an input interface to receive the electrical signal from the first transmission line that is formed on or within the communication plane and off of the communication plane, one or more circuits to compensate for at least one of loss experienced by the electrical signal due to the transmission along the first transmission line and loss that will be experienced due to transmission along the second transmission line to generate the compensated electrical signal, and an output interface to transmit the compensated electrical signal back onto the communication plane and to the second communication card along the second transmission line that is formed on or within the communication plane.

2. The electronic device of claim 1,
wherein the communication plane includes a plurality of connectors at connection points of one or more of the plurality of transmission lines,
wherein a first and second one of the connectors provides an electrical socket for receiving the input interface the output interface, respectively, of the pluggable module.

3. The electronic device of claim 1,
wherein the electrical signal comprises a first signal, the compensated electrical signal comprises a first compensated electrical signal, the input interface comprises a first input interface, and the output interface comprises a first output interface,
wherein the pluggable module comprises a second input interface and a second output interface,
wherein the second input interface is configured to receive a second electrical signal from off of the communication plane that is transmitted by the second communication card along the second transmission line,
wherein the one or more circuits are configured to compensate for at least one of loss experienced by the second electrical signal due to the transmission along the second transmission line and loss that will be experienced due to transmission along the first transmission line to generate a second compensated electrical signal, and
wherein the second output interface is configured to transmit the second compensated electrical signal back onto the communication plane and to the first communication card along the first transmission line.

4. The electronic device of claim 1, wherein the one or more circuits of the pluggable module comprise an equalizer configured to compensate for part of the loss experienced by the electrical signal.

5. The electronic device of claim 4, wherein the one or more circuits of the pluggable module further comprise a clock-and-data recovery circuit configured to receive the electrical signal as compensated by the equalizer, compensate for an additional part of the loss experienced by the electrical signal, and retime the electrical signal to generate the compensated electrical signal.

6. The electronic device of claim 1, wherein the one or more circuits of the pluggable module comprise a pre-compensator configured to pre-compensate for loss that the electrical signal will experience due to the transmission along the second transmission line.

7. The electronic device of claim 1, wherein the electrical signal comprises a first electrical signal, the communication plane further comprising:
a third transmission line along which a third one of the communication cards transmits a second electrical signal to the first communication card without transmitting the second electrical signal to the pluggable module.

8. The electronic device of claim 1, wherein the second one of the communication cards is configured to process the compensated electrical signal without retiming the compensated electrical signal.

9. The electronic device of claim 1, wherein the electronic device comprises a router, and wherein the plurality of communication cards are selected from a set comprising a physical interface card, a switch fabric card, a service card.

10. The electronic device of claim 1,
wherein, if the pluggable module is not coupled to the communication plane, the first one of the communication card transmits the electrical signal to the second one of the communication card via a third transmission line of the plurality of transmission lines that directly interconnects a first slot that receives the first one of the communication cards to a second slot that receives the second one of the communication cards, and
wherein, when the pluggable module is coupled to the communication plane, the coupling of the pluggable module redirects the electrical signal from the third transmission line to the pluggable module via the first transmission line and out of the pluggable module via the second transmission line.

11. A method comprising:
transmitting, with a first one of a plurality of communication cards, electrical signal along a first transmission line of a plurality of transmission lines formed on or within a communication plane of an electronic device;
receiving, with a pluggable module that is removably coupled to and external from the communication plane, the electrical signal from the first transmission line formed on or within the communication plane and off of the communication plane;
compensating, with the pluggable module, for at least one of loss experienced by the electrical signal due to the transmission along the first transmission line formed on or within the communication plane and loss that will be experienced due to the transmission along a second transmission line formed on or within the communication plane to generate a compensated electrical signal;
transmitting, with the pluggable module, the compensated electrical signal back onto the communication plane and to a second one of the plurality of communication cards along the second transmission line formed on or within the communication plane; and
receiving, with the second one of the plurality of communication cards, the compensated electrical signal.

12. The method of claim 11, further comprising:
coupling the pluggable module to the communication plane via a plurality of connectors.

13. The method of claim 11, wherein the electrical signal comprises a first electrical signal and the compensated electrical signal comprises a first compensated electrical signal, the method further comprising:
receiving a second electrical signal from off of the communication plane that is transmitted by the second communication card along the second transmission line;
compensating for at least one of loss experienced by the second electrical signal due to the transmission along the second transmission line and loss that will be experienced due to transmission along the first transmission line to generate a second compensated electrical signal; and
transmitting the second electrical compensated signal back onto the communication plane and to the first communication card along the first transmission line.

14. The method of claim 11, wherein compensating comprises equalizing for part of the loss experienced by the electrical signal.

15. The method of claim 11, wherein compensating comprises equalizing for part of the loss experienced by the electrical signal and retiming for an additional part of the loss experienced by the electrical signal.

16. The method of claim 11, wherein compensating comprises pre-compensating for loss that the electrical signal will experience due to the transmission along the second transmission line.

17. The method of claim 11, wherein the electrical signal comprises a first electrical signal, the method further comprising:
   transmitting a second electrical signal to the first one of the plurality of communication cards along a third transmission line of the communication plane without transmitting the second electrical signal to the pluggable module.

18. The method of claim 11, further comprising:
   processing the compensated electrical signal, with the second one of the plurality of communication cards, without the second one of the plurality of communication cards retiming the compensated electrical signal.

19. The method of claim 11, wherein the electronic device comprises a router, and wherein the plurality of communication cards are selected from a set comprising a physical interface card, a switch fabric card, a service card.

20. The method of claim 11, further comprising:
   if the pluggable module is not coupled to the communication plane, transmitting, with the first one of the plurality of communication cards, the electrical signal along a third transmission line of the plurality of transmission lines that directly interconnects a first slot that receives the first one of the plurality of communication cards to a second slot that receives the second one of the plurality of communication cards; and
   when the pluggable module is coupled to the communication plane, redirecting the electrical signal from the third transmission line for the transmission along the first transmission line to the pluggable module and from the pluggable module along the second transmission line.

21. A pluggable module comprising:
   an input interface configured to receive an electrical signal from off of a communication plane, wherein the signal is transmitted by a first communication card along a first transmission line formed on or within the communication plane;
   one or more circuits configured to compensate for at least one of loss experienced by the electrical signal due to the transmission along the first transmission line formed on or within the communication plane and loss that will be experienced due to transmission along a second transmission line formed on or within the communication plane to generate a compensated electrical signal; and
   an output interface configured to transmit the compensated electrical signal back onto the communication plane and to a second communication card along the second transmission line formed on or within the communication plane,
   wherein the pluggable module is removably coupled to and external from the communication plane.

22. The pluggable module of claim 21, wherein the electrical signal comprises a first electrical signal, the compensated electrical signal comprises a first compensated electrical signal, the input interface comprises a first input interface, and the output interface comprises a first output interface, the pluggable module further comprising a second input interface and a second output interface,
   wherein the second input interface is configured to receive a second electrical signal from off of the communication plane that is transmitted by the second communication card along the second transmission line,
   wherein the one or more circuits are configured to compensate for at least one of loss experienced by the second electrical signal due to the transmission along the second transmission line and loss that will be experienced due to transmission along the first transmission line to generate a second compensated electrical signal, and
   wherein the second output interface is configured to transmit the second compensated signal back onto the communication plane and to the first communication card along the first transmission line.

* * * * *